United States Patent
Purdy

(10) Patent No.: US 8,224,856 B2
(45) Date of Patent: Jul. 17, 2012

(54) INTELLIGENT DEFAULT WEIGHTING PROCESS FOR CRITERIA UTILIZED TO SCORE MEDIA CONTENT ITEMS

(75) Inventor: Sean Purdy, Durham, NC (US)

(73) Assignee: Abo Enterprises, LLC, Wilmington, DE (US)

( * ) Notice: Subject to any disclaimer, the term of this patent is extended or adjusted under 35 U.S.C. 154(b) by 555 days.

(21) Appl. No.: 11/944,962

(22) Filed: Nov. 26, 2007

(65) Prior Publication Data
US 2009/0138505 A1    May 28, 2009

(51) Int. Cl.
*G06F 17/30* (2006.01)
(52) U.S. Cl. ........................................ 707/791
(58) Field of Classification Search .................. 707/609, 707/705, 765, 791, 802
See application file for complete search history.

(56) References Cited

U.S. PATENT DOCUMENTS

| | | |
|---|---|---|
| 5,581,704 A | 12/1996 | Barbara et al. |
| 5,616,876 A | 4/1997 | Cluts |
| 5,706,435 A | 1/1998 | Barbara et al. |
| 5,754,939 A | 5/1998 | Herz et al. |
| 5,758,347 A | 5/1998 | Lo et al. |
| 5,857,207 A | 1/1999 | Lo et al. |
| 5,870,764 A | 2/1999 | Lo et al. |
| 5,890,152 A | 3/1999 | Rapaport et al. |
| 5,918,223 A | 6/1999 | Blum et al. |
| 6,192,340 B1 | 2/2001 | Abecassis |
| 6,195,657 B1 | 2/2001 | Rucker et al. |
| 6,201,176 B1 | 3/2001 | Yourlo |
| 6,236,990 B1 | 5/2001 | Geller et al. |
| 6,438,579 B1 | 8/2002 | Hosken |
| 6,493,762 B1 | 12/2002 | Chen et al. |
| 6,498,955 B1 | 12/2002 | McCarthy et al. |
| 6,636,836 B1 | 10/2003 | Pyo |
| 6,657,116 B1 | 12/2003 | Gunnerson |
| 6,757,691 B1 | 6/2004 | Welsh et al. |
| 6,785,688 B2 | 8/2004 | Abajian et al. |
| 6,865,600 B1 | 3/2005 | Brydon et al. |

(Continued)

FOREIGN PATENT DOCUMENTS

CN    1383328 A    12/2002
(Continued)

OTHER PUBLICATIONS

"AOL Music Now," http://web.archive.org/web/20060508184531/aol.musicnow.com/az/home.jhtml?_requesti..., copyright 2006 AOL Music Now LLC, printed Nov. 16, 2007, 1 page.

(Continued)

*Primary Examiner* — Fred I Ehichioya
(74) *Attorney, Agent, or Firm* — Withrow & Terranova, PLLC

(57) ABSTRACT

A system and method are provided for intelligently, or programmatically, assigning weights for one or more criterion utilized to score media content items based on an analysis of a group of media content items. In general, scoring criteria to be used to score media content items for a user are defined. A group of media content items associated with the user is then analyzed with respect to the criteria to provide results such as a number or percentage of media content items from the group of media content items that satisfy each of the scoring criteria. Based on the results of the analysis, a weight is assigned to each of the scoring criteria. Thereafter, media content items are scored for the user as a function of the weights assigned to the scoring criteria.

26 Claims, 9 Drawing Sheets

U.S. PATENT DOCUMENTS

| | | |
|---|---|---|
| 6,933,433 B1 | 8/2005 | Porteus et al. |
| 6,937,730 B1 | 8/2005 | Buxton |
| 6,941,324 B2 | 9/2005 | Plastina et al. |
| 7,000,188 B1 | 2/2006 | Eustace |
| 7,028,082 B1 | 4/2006 | Rosenberg et al. |
| 7,096,234 B2 | 8/2006 | Plastina et al. |
| 7,096,486 B1 | 8/2006 | Ukai et al. |
| 7,143,241 B2 | 11/2006 | Hull |
| 7,146,627 B1 | 12/2006 | Ismail et al. |
| 7,185,355 B1 | 2/2007 | Ellis et al. |
| 7,200,852 B1 | 4/2007 | Block |
| 7,233,948 B1 | 6/2007 | Shamoon et al. |
| 7,283,992 B2 | 10/2007 | Liu et al. |
| 7,296,285 B1 | 11/2007 | Jun et al. |
| 7,321,923 B1 | 1/2008 | Rosenberg et al. |
| 7,360,160 B2 | 4/2008 | Matz |
| 7,403,787 B2 | 7/2008 | Helferich |
| 7,496,623 B2 | 2/2009 | Szeto et al. |
| 7,504,576 B2 | 3/2009 | Georges |
| 7,529,743 B1 | 5/2009 | Ershov |
| 7,567,525 B2 | 7/2009 | Liao et al. |
| 7,570,943 B2 | 8/2009 | Sorvari et al. |
| 7,580,932 B2 | 8/2009 | Plastina et al. |
| 7,614,006 B2 | 11/2009 | Molander |
| 7,680,959 B2 | 3/2010 | Svendsen |
| 7,693,906 B1 | 4/2010 | Amidon et al. |
| 7,720,871 B2 | 5/2010 | Rogers et al. |
| 7,941,764 B2 | 5/2011 | Svendsen et al. |
| 8,005,841 B1 | 8/2011 | Walsh et al. |
| 8,059,646 B2 | 11/2011 | Svendsen et al. |
| 2001/0021914 A1 | 9/2001 | Jacobi et al. |
| 2001/0023401 A1 | 9/2001 | Weishut et al. |
| 2002/0002483 A1 | 1/2002 | Siegel et al. |
| 2002/0002899 A1 | 1/2002 | Gjerdingen et al. |
| 2002/0019858 A1 | 2/2002 | Kaiser et al. |
| 2002/0037083 A1 | 3/2002 | Weare et al. |
| 2002/0052873 A1 | 5/2002 | Delgado et al. |
| 2002/0073167 A1 | 6/2002 | Powell et al. |
| 2002/0082901 A1 | 6/2002 | Dunning et al. |
| 2002/0087565 A1 | 7/2002 | Hoekman et al. |
| 2002/0099697 A1 | 7/2002 | Jensen-Grey |
| 2002/0103796 A1 | 8/2002 | Hartley |
| 2002/0129168 A1 | 9/2002 | Kanai et al. |
| 2002/0138630 A1 | 9/2002 | Solomon et al. |
| 2002/0157096 A1 | 10/2002 | Hane et al. |
| 2002/0194285 A1 | 12/2002 | Mousseau et al. |
| 2002/0199194 A1 | 12/2002 | Ali |
| 2003/0005047 A1 | 1/2003 | Seki et al. |
| 2003/0014407 A1 | 1/2003 | Blatter et al. |
| 2003/0033347 A1 | 2/2003 | Bolle et al. |
| 2003/0045953 A1 | 3/2003 | Weare |
| 2003/0045954 A1 | 3/2003 | Weare et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0089218 A1 | 5/2003 | Gang et al. |
| 2003/0110503 A1 | 6/2003 | Perkes |
| 2003/0135513 A1 | 7/2003 | Quinn et al. |
| 2003/0140123 A1 | 7/2003 | Master et al. |
| 2003/0160770 A1 | 8/2003 | Zimmerman |
| 2003/0191753 A1 | 10/2003 | Hoch |
| 2003/0217055 A1 | 11/2003 | Lee et al. |
| 2003/0233241 A1 | 12/2003 | Marsh |
| 2003/0236582 A1 | 12/2003 | Zamir et al. |
| 2004/0019608 A1 | 1/2004 | Obrador |
| 2004/0030832 A1 | 2/2004 | Squibbs |
| 2004/0078383 A1 | 4/2004 | Mercer |
| 2004/0093466 A1 | 5/2004 | Hull |
| 2004/0128286 A1 | 7/2004 | Yasushi et al. |
| 2004/0139059 A1 | 7/2004 | Conroy et al. |
| 2004/0158870 A1 | 8/2004 | Paxton et al. |
| 2004/0160971 A1 | 8/2004 | Krause et al. |
| 2004/0254911 A1 | 12/2004 | Grasso et al. |
| 2005/0021420 A1 | 1/2005 | Michelitsch et al. |
| 2005/0038819 A1 | 2/2005 | Hicken et al. |
| 2005/0071221 A1 | 3/2005 | Selby |
| 2005/0076056 A1 | 4/2005 | Paalasmaa et al. |
| 2005/0108233 A1 | 5/2005 | Metsatahti et al. |
| 2005/0120053 A1 | 6/2005 | Watson |
| 2005/0158028 A1 | 7/2005 | Koba |
| 2005/0177516 A1 | 8/2005 | Vandewater et al. |
| 2005/0177568 A1 | 8/2005 | Diamond et al. |
| 2005/0187943 A1 | 8/2005 | Finke-Anlauff et al. |
| 2005/0192987 A1 | 9/2005 | Marsh |
| 2005/0197961 A1 | 9/2005 | Miller et al. |
| 2005/0234995 A1 | 10/2005 | Plastina et al. |
| 2005/0240661 A1 | 10/2005 | Heller et al. |
| 2005/0246740 A1 | 11/2005 | Teraci |
| 2005/0256756 A1 | 11/2005 | Lam et al. |
| 2005/0267944 A1 | 12/2005 | Little et al. |
| 2005/0278364 A1 | 12/2005 | Kamen |
| 2005/0278758 A1 | 12/2005 | Bodleander |
| 2005/0283791 A1* | 12/2005 | McCarthy et al. .............. 725/1 |
| 2006/0004923 A1 | 1/2006 | Cohen et al. |
| 2006/0008256 A1 | 1/2006 | Khedouri et al. |
| 2006/0010167 A1 | 1/2006 | Grace et al. |
| 2006/0020538 A1 | 1/2006 | Ram |
| 2006/0020662 A1 | 1/2006 | Robinson |
| 2006/0020962 A1 | 1/2006 | Stark et al. |
| 2006/0026048 A1 | 2/2006 | Kolawa et al. |
| 2006/0032363 A1 | 2/2006 | Platt |
| 2006/0064721 A1 | 3/2006 | Del Val et al. |
| 2006/0069769 A1 | 3/2006 | Dacosta |
| 2006/0083119 A1 | 4/2006 | Hayes |
| 2006/0100978 A1 | 5/2006 | Heller et al. |
| 2006/0112082 A1 | 5/2006 | Platt et al. |
| 2006/0117260 A1 | 6/2006 | Sloo et al. |
| 2006/0129544 A1 | 6/2006 | Yoon et al. |
| 2006/0167991 A1 | 7/2006 | Heikes et al. |
| 2006/0173910 A1 | 8/2006 | McLaughlin |
| 2006/0195512 A1 | 8/2006 | Rogers et al. |
| 2006/0195514 A1 | 8/2006 | Rogers et al. |
| 2006/0195790 A1 | 8/2006 | Beaupre et al. |
| 2006/0218187 A1 | 9/2006 | Plastina et al. |
| 2006/0224435 A1 | 10/2006 | Male et al. |
| 2006/0230065 A1 | 10/2006 | Plastina et al. |
| 2006/0240868 A1 | 10/2006 | Kaplan et al. |
| 2006/0241901 A1 | 10/2006 | Hanus et al. |
| 2006/0242178 A1 | 10/2006 | Butterfield et al. |
| 2006/0242661 A1 | 10/2006 | Bodlaender et al. |
| 2006/0254409 A1 | 11/2006 | Withop |
| 2006/0271959 A1 | 11/2006 | Jacoby et al. |
| 2006/0277098 A1 | 12/2006 | Chung et al. |
| 2006/0288074 A1 | 12/2006 | Rosenberg |
| 2007/0005795 A1 | 1/2007 | Gonzalez |
| 2007/0011095 A1 | 1/2007 | Vilcauskas et al. |
| 2007/0011150 A1 | 1/2007 | Frank |
| 2007/0025194 A1 | 2/2007 | Morse et al. |
| 2007/0033419 A1 | 2/2007 | Kocher et al. |
| 2007/0053268 A1 | 3/2007 | Crandall et al. |
| 2007/0078832 A1 | 4/2007 | Ott, IV et al. |
| 2007/0078895 A1 | 4/2007 | Hsieh et al. |
| 2007/0089057 A1 | 4/2007 | Kindig |
| 2007/0094215 A1 | 4/2007 | Toms et al. |
| 2007/0118802 A1 | 5/2007 | Gerace et al. |
| 2007/0124325 A1 | 5/2007 | Moore et al. |
| 2007/0130207 A1 | 6/2007 | Pate et al. |
| 2007/0152502 A1 | 7/2007 | Kinsey et al. |
| 2007/0162502 A1 | 7/2007 | Thomas et al. |
| 2007/0169148 A1 | 7/2007 | Oddo et al. |
| 2007/0208802 A1 | 9/2007 | Barman et al. |
| 2007/0220100 A1 | 9/2007 | Rosenberg |
| 2007/0255797 A1 | 11/2007 | Dunn et al. |
| 2007/0265979 A1 | 11/2007 | Hangartner |
| 2007/0266049 A1 | 11/2007 | Cohen et al. |
| 2007/0266402 A1 | 11/2007 | Pawlak et al. |
| 2007/0271287 A1 | 11/2007 | Acharya et al. |
| 2007/0282472 A1 | 12/2007 | Seldman |
| 2007/0288546 A1 | 12/2007 | Rosenberg |
| 2008/0005301 A1 | 1/2008 | Li et al. |
| 2008/0016205 A1 | 1/2008 | Svendsen |
| 2008/0040474 A1 | 2/2008 | Zuckerberg et al. |
| 2008/0052371 A1 | 2/2008 | Partovi et al. |
| 2008/0059422 A1 | 3/2008 | Tenni et al. |
| 2008/0059576 A1 | 3/2008 | Liu et al. |
| 2008/0062318 A1* | 3/2008 | Ellis et al. .............. 348/564 |
| 2008/0091771 A1 | 4/2008 | Allen et al. |

| | | | |
|---|---|---|---|
| 2008/0126191 | A1 | 5/2008 | Schiavi |
| 2008/0133601 | A1 | 6/2008 | Martin Cervera et al. |
| 2008/0134039 | A1 | 6/2008 | Fischer et al. |
| 2008/0134053 | A1 | 6/2008 | Fischer |
| 2008/0140717 | A1 | 6/2008 | Rosenberg et al. |
| 2008/0141315 | A1 | 6/2008 | Ogilvie |
| 2008/0147482 | A1 | 6/2008 | Messing et al. |
| 2008/0147711 | A1 | 6/2008 | Spiegelman et al. |
| 2008/0189295 | A1 | 8/2008 | Khedouri et al. |
| 2008/0195657 | A1 | 8/2008 | Naaman et al. |
| 2008/0201446 | A1 | 8/2008 | Svendsen |
| 2008/0208823 | A1 | 8/2008 | Hicken |
| 2008/0209482 | A1 | 8/2008 | Meek et al. |
| 2008/0222546 | A1 | 9/2008 | Mudd et al. |
| 2008/0243733 | A1 | 10/2008 | Black |
| 2008/0250067 | A1 | 10/2008 | Svendsen |
| 2008/0301118 | A1 | 12/2008 | Chien et al. |
| 2008/0307316 | A1 | 12/2008 | Askey |
| 2009/0006368 | A1 | 1/2009 | Mei et al. |
| 2009/0006374 | A1 | 1/2009 | Kim et al. |
| 2009/0042545 | A1 | 2/2009 | Avital et al. |
| 2009/0046101 | A1 | 2/2009 | Askey et al. |
| 2009/0049030 | A1* | 2/2009 | Svendsen et al. ............... 707/5 |
| 2009/0049045 | A1 | 2/2009 | Askey et al. |
| 2009/0055385 | A1 | 2/2009 | Jeon et al. |
| 2009/0055396 | A1 | 2/2009 | Svendsen et al. |
| 2009/0055467 | A1 | 2/2009 | Petersen |
| 2009/0055759 | A1 | 2/2009 | Svendsen |
| 2009/0076881 | A1 | 3/2009 | Svendsen |
| 2009/0077499 | A1 | 3/2009 | Svendsen et al. |
| 2009/0083116 | A1 | 3/2009 | Svendsen |
| 2009/0083117 | A1 | 3/2009 | Svendsen et al. |
| 2009/0083362 | A1 | 3/2009 | Svendsen |
| 2009/0119328 | A1 | 5/2009 | Raza et al. |
| 2009/0129671 | A1 | 5/2009 | Hu et al. |
| 2009/0144325 | A1 | 6/2009 | Chastagnol et al. |
| 2009/0144326 | A1 | 6/2009 | Chastagnol et al. |
| 2009/0254572 | A1 | 10/2009 | Redlich et al. |
| 2010/0005116 | A1 | 1/2010 | Yoon et al. |
| 2010/0063975 | A1 | 3/2010 | Hayes |
| 2012/0041902 | A1 | 2/2012 | Svendsen et al. |
| 2012/0042245 | A1 | 2/2012 | Askey et al. |

FOREIGN PATENT DOCUMENTS

| | | |
|---|---|---|
| CN | 1841385 A | 10/2006 |
| EP | 1686497 A2 | 8/2006 |
| EP | 1791130 A2 | 5/2007 |
| WO | 01/77907 A2 | 10/2001 |
| WO | 01/84353 A2 | 11/2001 |
| WO | 02/21335 A1 | 3/2002 |
| WO | 03/019560 A2 | 3/2003 |
| WO | 2004/017178 A2 | 2/2004 |
| WO | 2005/038666 A1 | 4/2005 |
| WO | WO2005038666 A1 * | 4/2005 |
| WO | 2005/052814 A1 | 6/2005 |
| WO | 2006/075032 A1 | 7/2006 |
| WO | 2007/032003 A2 | 3/2007 |
| WO | 2007/044389 A2 | 4/2007 |
| WO | 2007/092781 A2 | 8/2007 |

OTHER PUBLICATIONS

"Apple—iPod classic," http://www.apple.com/ipodclassic/, printed Oct. 26, 2007, 1 page.
"Apple—iPod + iTunes," http://www.applecom/itunes/, copyright 2007 Paramount Pictures, printed Feb. 7, 2007, 2 pages.
"Motorola Phones Tools—Features—Motorola US," http://direct.motorola.com/ens/MPT/MPT_Feature.asp, copyright 2005-2007 Motorola inc., printed Nov. 16, 2007, 1 page.
"Rhapsody—Full-length music, videos and more—Free," http://www.rhapsody.com/welcome.html, copyright 1948-2007 Muze Inc., printed Feb. 7, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself," http://www.youtube.com/, copyright 2007 YouTube, LLC, printed Oct. 26, 2007, 2 pages.
"Welcome to Facebook!—Facebook," http://www.facebook.com/, copyright 2008 Facebook, printed Jan. 9, 2008, 1 page.
"Goombah—Preview," http://www.goombah.com/preview.html, printed Jan. 8, 2008, 5 pages.
Owen Kaser et al., "Tag-Cloud Drawing: Algorithms for Cloud Visualization," available from http://www2007.org/workshops/paper_12.pdf, 10 pages.
Joe Lamantia, "Second Generation Tag Clouds," copyright 2006 Joe Lamantia, available from http://www.joelamantia.com/blog/archives/ideas/second_generation_..., printed Nov. 29, 2007, 19 pages.
"MyStrands Download," http://www.mystrands.com/overview.vm, copyright 2003-2007 MediaStrands, Inc., printed Feb. 7, 2007, 3 pages.
"Developer News Archive," Audacity Wiki, retrieved Jun. 4, 2009 from http://audacityteam.org/wiki/index.php?title=Developer_News_Archive, 10 pages.
Steven Holzner, "Inside JavaScript," copyright 2009 Safari Books Online, 7 pages.
Hill et al., "Recommending and Evaluating Choices in a Virtual Community of Use," http://delivery.acm.org/10.1145/230000/223929/p1...1=GUIDE&dl=GUIDE&CFID=101371626&CFTOKEN=47493911, 1995, 15 pages.
Pouwelse et al., "P2P-based PVR Recommendation using Friends, Taste Buddies and Superpeers," Workshop: Beyond Personalization 2005, Jan. 9, 2005, 6 pages.
Xiong et al., "PeerTrust: Supporting Reputation-Based Trust for Peer-to-Peer Electronic Communities," IEEE Transaction on Knowledge and Date Engineering, vol. 6, No. 7, Jul. 2004, copyright 2004 IEEE, 15 pages.
Abstract, Chinese Patent Publication No. 1383328A, published Dec. 4, 2002, "Method and System for Recommending Program," Chinese Patent Application No. 20021018177, filed Apr. 23, 2002, Applicant: NEC Corp, Inventors: Hidegi Hane and Shinichiro Kamei, obtained from http://www.espacenet.com, as the abstract to related US Patent Application Publication No. 2002/0157096 A1, 2 pages.
Abstract, Chinese Patent Publication No. 1841385A, published Oct. 4, 2006, "Method of supplying content data and playlist thereof," Chinese Patent Application No. 20061073372, filed Mar. 31, 2006, Applicant: Sony Corp, Inventor: Takeh Miyajima Yasushi Yamashi, obtained from http://www.espacenet.com, 1 page.
Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.
"Amazon.com: Online Shopping for Electronics, Apparel, Computers, Books, DVDs & m . . . ," at <http://www.amazon.com/>, copyright 1996-2007, Amazon.com, Inc., printed Oct. 26, 2007, 4 pages.
Kristen Nicole, "YouTube Remixer—Online Video Editing for YouTube," at <http://mashable.com/2007/06/16/youtube-remixer/>, dated Jun. 16, 2007, printed Jan. 8, 2010, 4 pages.
Mitchell, Bradley, "Cable Speed—How Fast is Cable Modem Internet?," at <http://www.compnetworking.about.com/od/internetaccessbestuses/f/cablespeed.htm>, copyright 2005, About, Inc., printed Feb. 24, 2010, 2 pages.
"Musicstrands.Com—Because Music is Social," brochure, copyright 2006, MusicStrands, Inc., 2 pages.
"MyStrands Labs: Patent-pending Technologies," at <http://labs.mystrands.com/patents.html>, printed Feb. 7, 2007, 5 pages.
"Pandora Internet Radio—Find New Music, Listen to Free Web Radio," at <http://www.pandora.com/>, copyright 2005-2007, Pandora Media, Inc., printed Feb. 7, 2007, 1 page.
"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.

"Press Release: UGC Whitepaper released—eModeration," Feb. 22, 2007, at <http://www.emoderation.com/news/press-release-ugc-whitepaper-released>, copyright 2006-2009, eModeration, printed Apr. 28, 2009, 3 pages.

"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestream%20review%20of%20personalization&source=web&cd=1&ved=0CDcQFjAA&url=http%3A%2F%2Fwww.behavioraltargeting.info%2Fdownloadattachment.php%3Fald%3Dcf74d490a8b97edd535b4ccdbfd0df55%26articleld%3D31&ei=C2jeTr71AurZ0QGCgsGvBw&usg=...>, 13 pages.

"The Bridge Ratings Report—The Impact of Wireless Internet," Luce Performance Group, International, study from interviews conducted between Jul. 5, 2007 and Aug. 31, 2007, date of publication unknown, file obtained Dec. 13, 2007, 6 pages.

Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.

* cited by examiner

INTELLIGENT DEFAULT WEIGHTING PROCESS FOR CRITERIA UTILIZED TO SCORE MEDIA CONTENT ITEMS

FIELD OF THE INVENTION

The present invention relates to digital media content items and more particularly relates to assigning weights to criteria utilized in a process of scoring media content items for a user.

BACKGROUND OF THE INVENTION

In today's digital world, the number of digital media content items, such as songs and videos, is enormous. For example, Apple's iTunes® Store currently has a catalog of 6 million songs, 100,000 podcasts, 30,000 audiobooks, 600 TV shows, and 500 movies. Of course, not all of these media content items are of interest to any one user. As such, there is a need for a technique for identifying media content items of interest to a user. In a similar fashion, personal media collections stored on users' personal computers or portable media players have also become large. Thus, there is also a need for prioritizing media content items in a user's personal media collection.

SUMMARY OF THE INVENTION

The present invention relates to a technique for intelligently, or programmatically, assigning weights for one or more criterion used to score media content items based on an analysis of a group of media content items. The scores of the media content items may be used to, for example, prioritize media content items in a playlist, make recommendations to a user in an e-commerce system, or the like. In general, scoring criteria to be used to score media content items for a user are defined. A group of media content items associated with the user is then analyzed with respect to the criteria to provide results, such as a number or percentage of media content items from the group of media content items that satisfy each of the scoring criteria. The group of media content items analyzed may be, for example, a media collection of the user, one or more playlists created, owned, or acquired by the user, or a group of media content items otherwise defined by the user. Based on the results of the analysis, a weight is assigned to each of the scoring criteria. Thereafter, media content items are scored for the user as a function of the weights assigned to the scoring criteria.

In another embodiment, a number of criteria are defined. The criteria may be scoring criteria used to score media content items for a user or, alternatively, criteria to be used for analysis. A group of media content items associated with a user is then analyzed with respect to the criteria to provide results such as a number or percentage media content items from the group of media content items that satisfy each of the scoring criteria. The group of media content items analyzed may be, for example, a media collection of the user, one or more playlists created, owned, or acquired by the user, or a group of media content items otherwise defined by the user. The results of the analysis are presented to the associated user. The associated user is then enabled to take an action based on the results such as, for example, viewing a list of media content items from the group of media content items satisfying one or more select criteria from the criteria used for the analysis, re-classify one or more of the media content items from the group of media content items analyzed, or the like, or any combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 7:
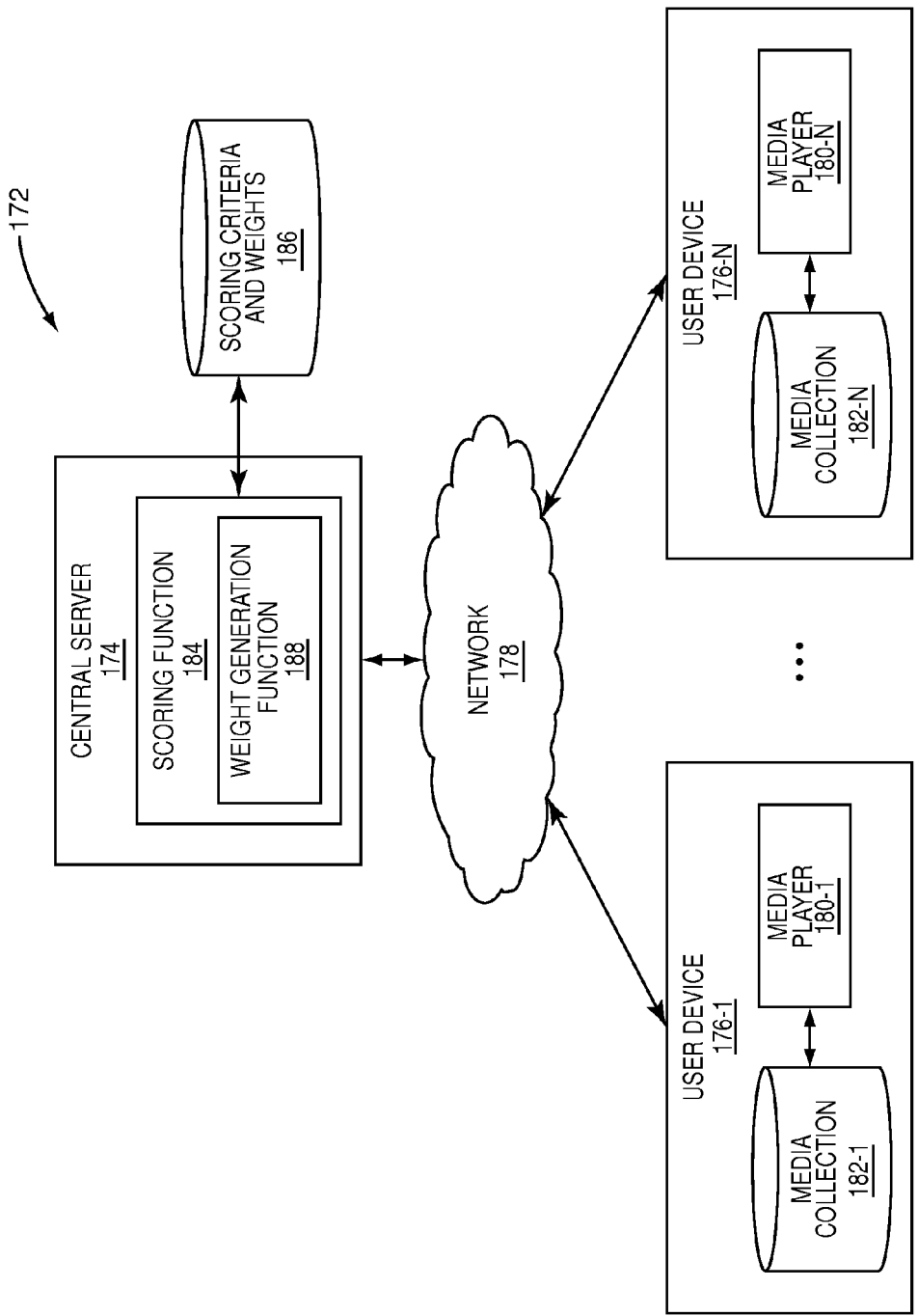
Figure 8:
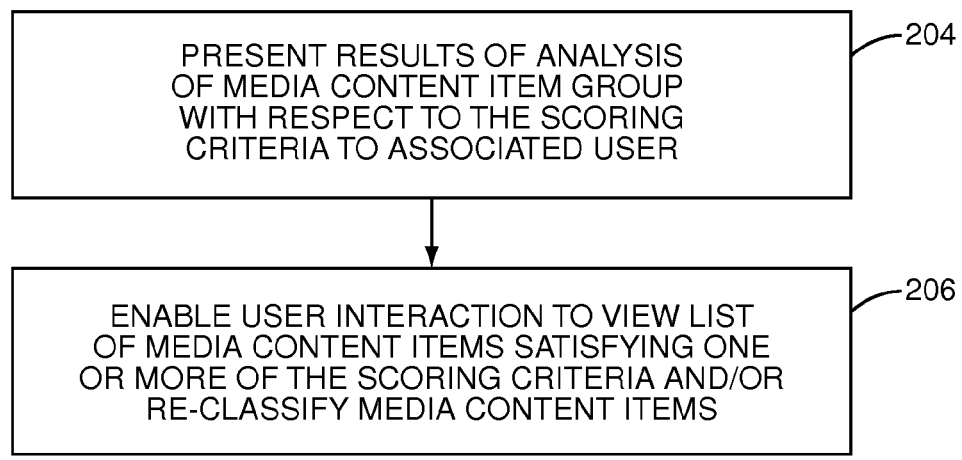
Figure 9:
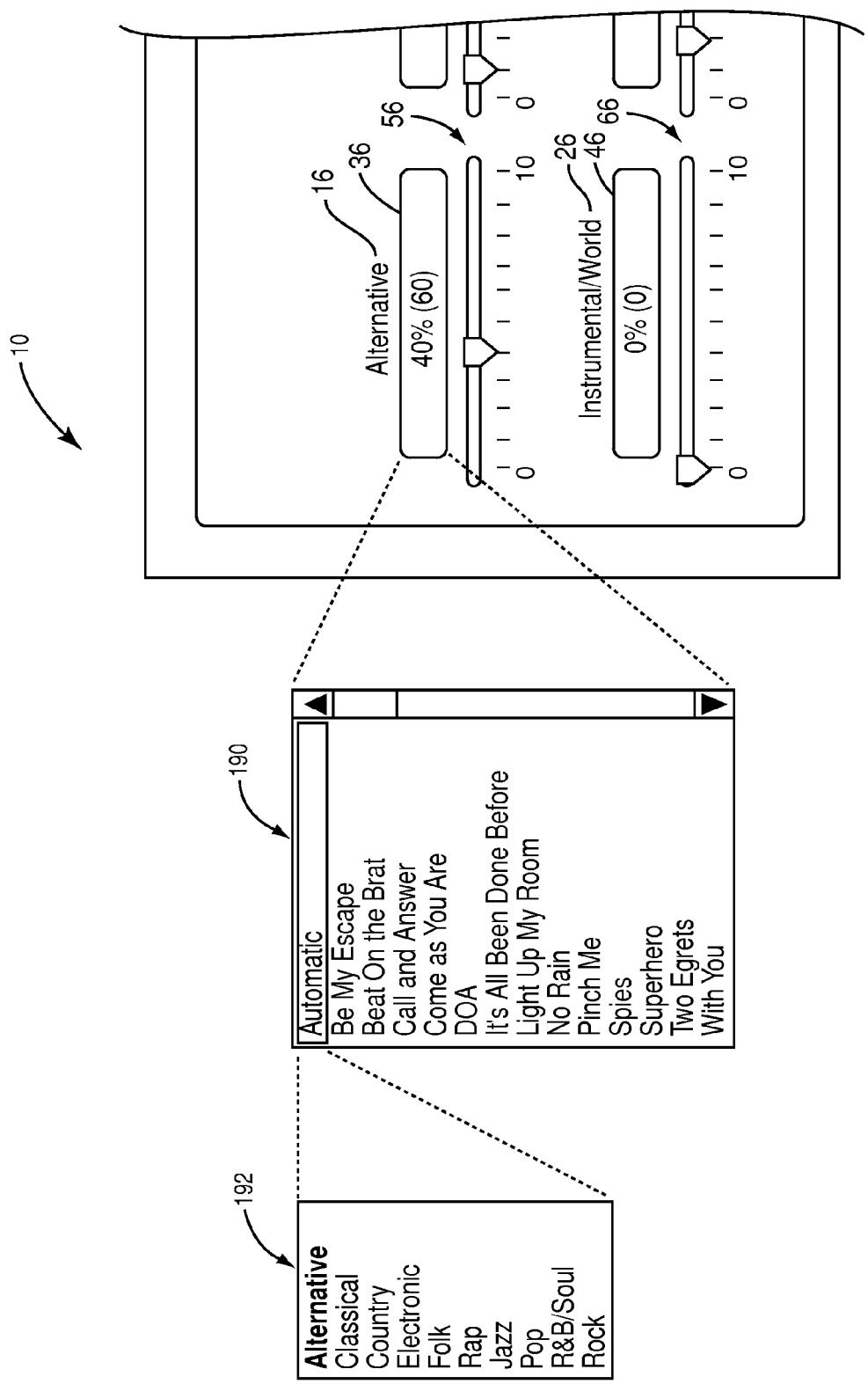

FIG. 7 illustrates a system including a central sever having a scoring function and weight assignment function according to one embodiment of the present invention; and FIGS. 8 and 9 are a flow chart and exemplary GUI for a process of presenting results of an analysis of a group of media content items to a user and enabling the user to initiate an action in response to the results according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to intelligently, or programmatically, assigning weights for one or more criterion utilized to score media content items. Note that while a "score" is preferably a numerical value, a "score" may be any type of indicator of a degree of relevancy of a media content item to a user. The degree of relevancy may be the degree of similarity between a particular media content item and a user's preferences, likes, or dislikes.

Figure 1:
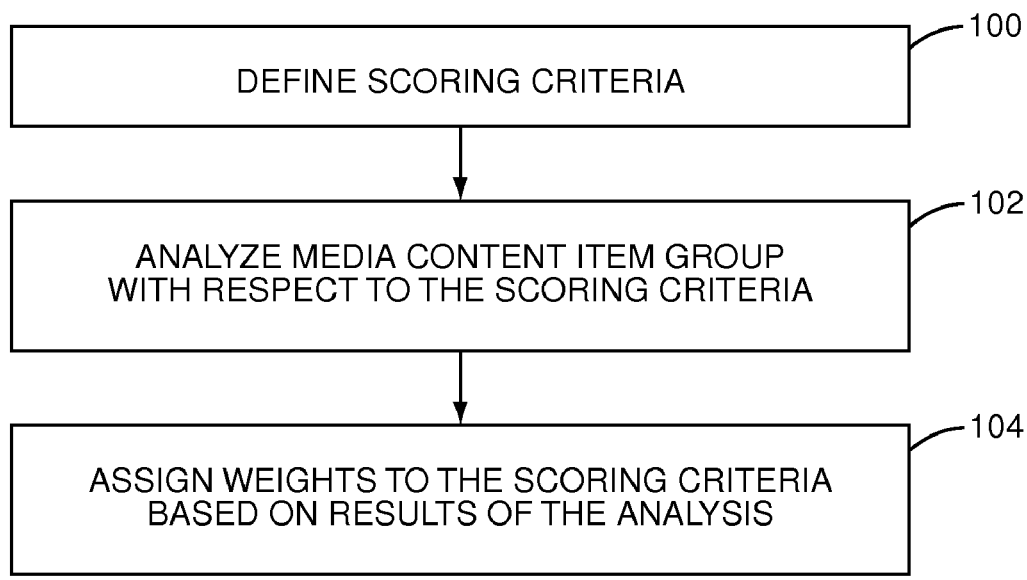
FIG. 1 is a flow chart illustrating a process for assigning weights to scoring criteria used to score media content items according to one embodiment of the present invention.

FIG. 1 is a flow chart illustrating a process for intelligently, or programmatically, assigning weights to scoring criteria to be used to score media content items according to one embodiment of the present invention. The media content items may be, for example, songs, music albums, videos such as movies, television programs, home movies, or video clips stored as digital video files, or the like, or any combination thereof. First, one or more scoring criterion is defined for scoring media content items for a user (step 100). Note that, while hereinafter referred to as "scoring criteria," it should be appreciated that there may be any number of one or more scoring criterion. The scoring criteria may be user-defined or system-defined. For example, the scoring criteria may include a number of music genres, music artists, video genres, actors or participants appearing in a video content item such as a movie or video clip, decades or other time periods of creation or release, or the like, or any combination thereof. The scoring criteria may additionally or alternatively include media categories, or groups, such as those described in commonly owned and assigned U.S. patent application Ser. No. 11/759,408 entitled SYSTEM AND METHOD FOR ASSIGNING USER PREFERENCE SETTINGS TO FIELDS IN A CATEGORY, PARTICULARLY A MEDIA CATEGORY, filed Jun. 7, 2007 and commonly owned and assigned U.S. patent application Ser. No. [P072 ], entitled GROUPING AND WEIGHTING MEDIA CATEGORIES WITH TIME PERIODS, filed Nov. 26, 2007, both of which are hereby incorporated herein by reference in their entireties.

Next, a group of media content items is analyzed with respect to the scoring criteria (step 102). The group of media content items analyzed may be, for example, a media collection of the user, media content items identified by one or more playlists created, owned, or acquired by the user, or a group of media content items otherwise associated with the user, such as a subset of the user's media collection. In one embodiment, the group of media content items is analyzed to determine a number of media content items from the group or a percentage of media content items from the group satisfying each scoring criterion. For example, if the scoring criteria includes the Rock music genre, the Country music genre, and the Alternative music genre, the group of media content items may be analyzed to determine a number or percentage of the media content items from the group classified in the Rock music genre, a number or percentage of the media content items from the group classified in the Country music genre, and a number or percentage of the media content items from the group classified in the Alternative music genre.

Once the analysis is complete, weights are assigned to the scoring criteria based on the results of the analysis (step 104). More specifically, a weight is assigned to each scoring criterion. As used herein, weights may generally be any type of relative values. Preferably, the weights are numerical values. However, the weights may alternatively be other types of relative values such as, for example, "high," "medium," and "low," or the like. In one embodiment, the weights are assigned to the scoring criteria by directly translating the percentage of media content items satisfying each scoring criterion into a weight for that scoring criterion. As an example, assume that the scoring criteria are a number of music genres and the results of the analysis of step 102 are:

| | |
|---|---|
| Alternative: | 40% (60 items) |
| Classical: | 5% (7 items) |
| Country/Folk: | 5% (8 items) |
| Electronic: | 30% (45 items) |
| Hip-Hop/Rap: | 0% (0 items) |
| Instrumental/World: | 0% (0 items) |
| Pop: | 15% (22 items) |
| R&B/Soul: | 0% (0 items) |
| Rock: | 5% (7 items) |
| Vocal/Performance: | 0% (0 items). |

As such, the following weights may be assigned:

| | |
|---|---|
| Alternative: | 4 |
| Classical: | 1 |
| Country/Folk: | 1 |
| Electronic: | 3 |
| Hip-Hop/Rap: | 0 |
| Instrumental/World: | 0 |
| Pop: | 2 |
| R&B/Soul: | 0 |
| Rock: | 1 |
| Vocal/Performance: | 0. |

Note that the weights have been rounded to the nearest whole number in this embodiment where applicable. For example, the weight assigned to the Classical music genre has been rounded up from 0.5 to 1.

Note that a default weight may be used for media content items not satisfying any of the scoring criteria. Where there is a direct translation between the percentage of media content items satisfying a scoring criterion and the weight assigned to that scoring criterion, the default weight may be scaled in order to prevent those media content items from being scored too highly. For example, the default weight may be one-half of the highest weight assigned to any of the scoring criteria.

In another embodiment, weights may be assigned to the scoring criteria by assigning a maximum weight to the scoring criteria having the greatest number of media content items or the greatest percentage of media content items from the group associated therewith. The weight for each of the remaining scoring criteria may then be determined as a function of a ratio of the number or percentage of media content items for the remaining scoring criteria to the number or percentage of media content items for the scoring criteria having been assigned the maximum weight. As an example, assume that the scoring criteria are a number of music genres and the results of the analysis of step 102 are:

| | |
|---|---|
| Alternative: | 40% (60 items) |
| Classical: | 5% (7 items) |
| Country/Folk: | 5% (8 items) |
| Electronic: | 30% (45 items) |
| Hip-Hop/Rap: | 0% (0 items) |
| Instrumental/World: | 0% (0 items) |
| Pop: | 15% (22 items) |
| R&B/Soul: | 0% (0 items) |
| Rock: | 5% (7 items) |
| Vocal/Performance: | 0% (0 items). |

As such, the following weights may be assigned:

| | |
|---|---|
| Alternative: | 10 |
| Classical: | 1 |
| Country/Folk: | 1 |
| Electronic: | 8 |
| Hip-Hop/Rap: | 0 |

-continued

| | |
|---|---|
| Instrumental/World: | 0 |
| Pop: | 4 |
| R&B/Soul: | 0 |
| Rock: | 1 |
| Vocal/Performance: | 0. |

In this example, the weight (weight$_{CRITERION}$) assigned to the music genres has been computed as:

$$weight_{CRITERION} = \text{round}\left(\frac{\frac{number\_of\_media\_content\_items_{CRITERION}}{number\_of\_media\_items_{MAX}} \cdot 100}{10}\right),$$

where number_of_media_content_items$_{CRITERION}$ is the number of media content items satisfying the scoring criterion and number_of_media_content_items$_{MAX}$ is the number of media content items satisfying the scoring criterion having the greatest number or percentage of media content items. The "round" function rounds to the nearest whole number. Thus, for example, the weight for the Classical music genre has been computed as:

$$weight_{CLASSICAL} =$$

$$\text{round}\left(\frac{\frac{number\_of\_media\_content\_items_{CLASSICAL}}{number\_of\_media\_items_{ALTERNATIVE}} \cdot 100}{10}\right)$$

$$weight_{CLASSICAL} = \text{round}\left(\frac{\frac{7}{60} \cdot 100}{10}\right) = 1.$$

Figure 2:
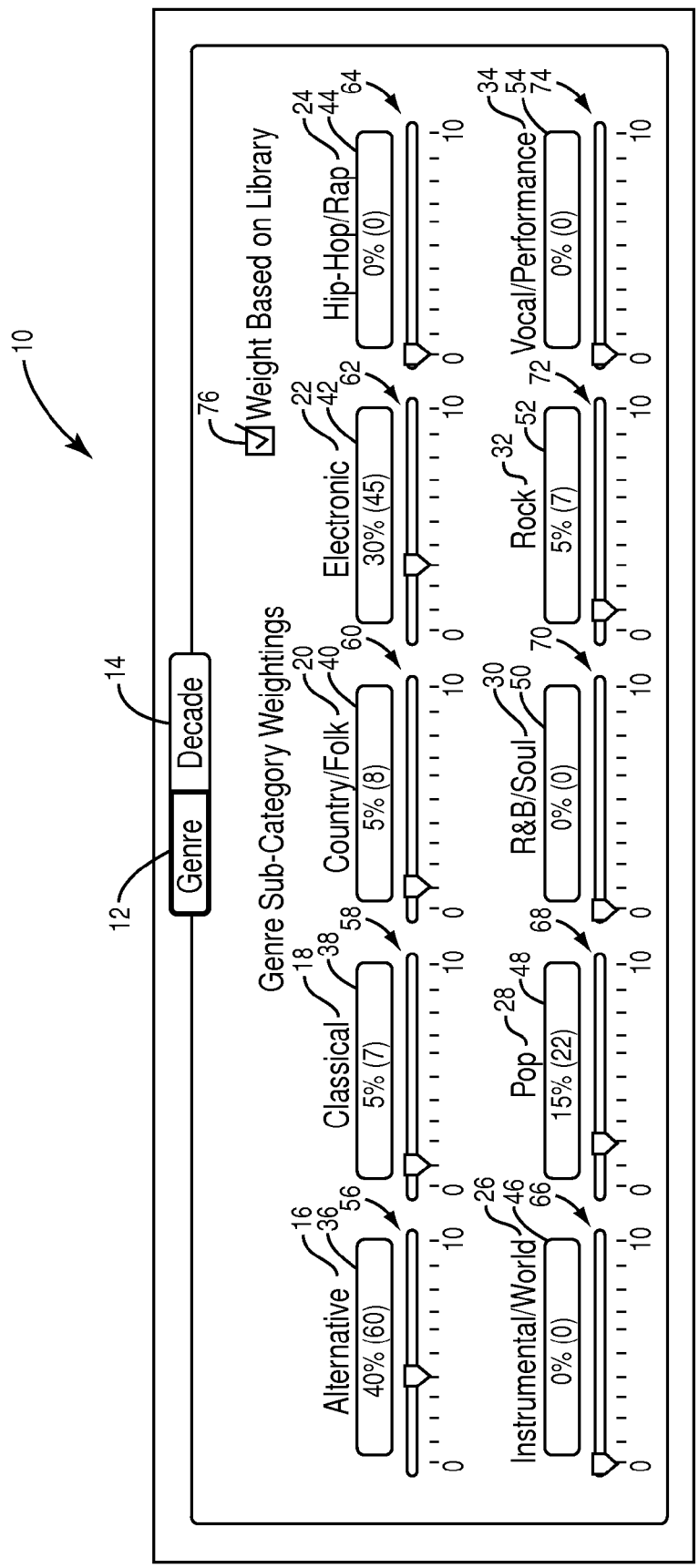
FIGS. 2 and 3 illustrate an exemplary Graphical User Interface (GUI) for presenting the scoring criteria, results of an analysis used to assign the weights for the scoring criteria, and the weights assigned to the scoring criteria to a user and enabling the user to manually adjust the weights assigned to the scoring criteria according to one embodiment of the present invention.
Figure 3:
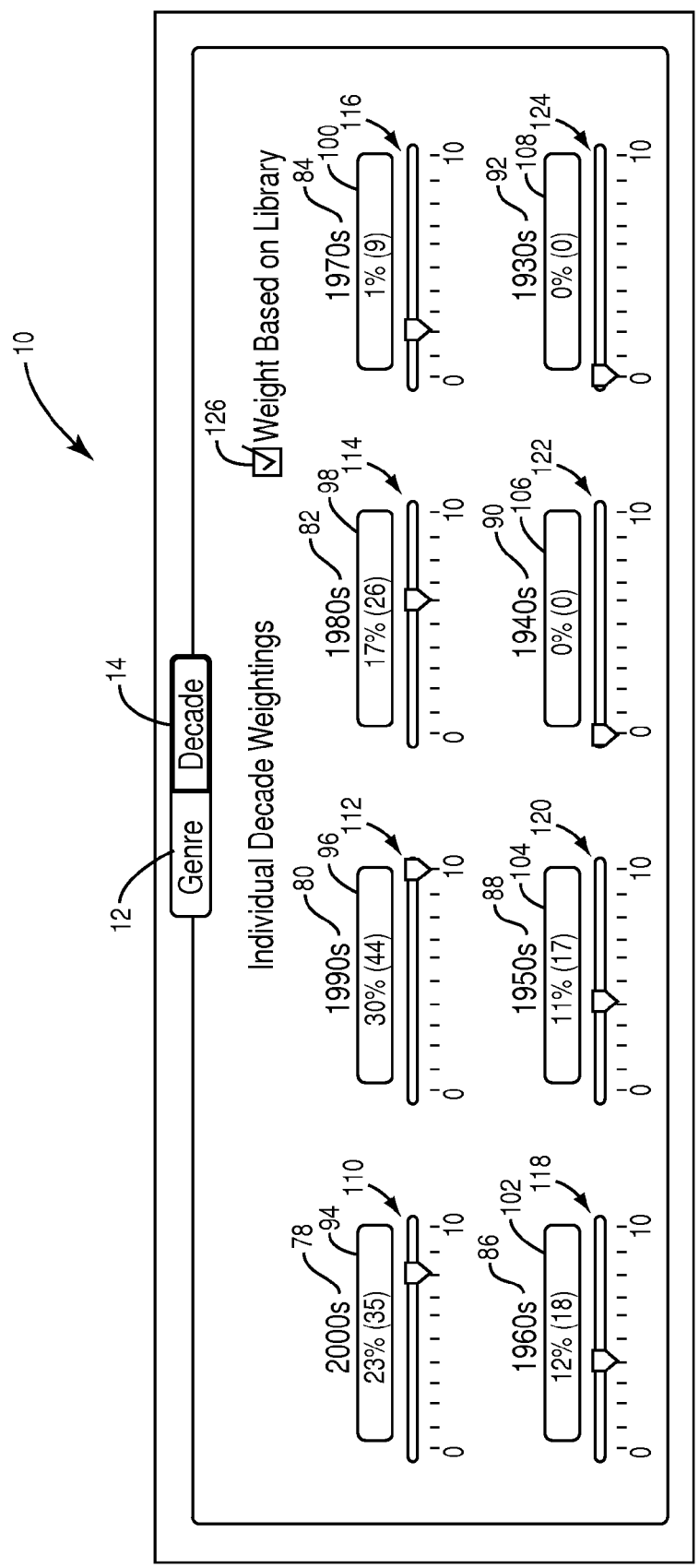

FIGS. 2 and 3 illustrate an exemplary Graphical User Interface (GUI) for presenting the results of the analysis of step 102 of FIG. 1 to the user for exemplary scoring criteria and enabling the user to manually adjust the programmatically assigned weights according to one embodiment of the present invention. More specifically, FIGS. 2 and 3 illustrate an exemplary GUI 10 including a genre tab 12 and a decade tab 14. The genre tab 12 enables the user to view genre related scoring criteria and, optionally, adjust the weights assigned to the genre related scoring criteria when selected. The decade tab 14 enables the user to view decade related scoring criteria and, optionally, adjust the weights assigned to the decade related scoring criteria when selected.

FIG. 2 illustrates the GUI 10 when the genre tab 12 is selected. As illustrated, the genre related scoring criteria includes a number of music genres 16-34. The results of the analysis of step 102 of FIG. 1 are presented in blocks 36-54 associated with the music genres 16-34. The blocks 36-54 may be display windows or, as discussed below, buttons or other selection means enabling the user to take some action. Sliding bars 56-74 define the weights assigned to the music genres 16-34. Initially, the weights, and thus the sliding bars 56-74, are set to the weights assigned to the music genres 16-34 based on the analysis of the group of media content items. The user may then manually adjust the weights by adjusting the sliding bars 56-74. Thus, the weights assigned based on the analysis of the group of media content items may serve as intelligent default weights for the music genres 16-34. Note that the sliding bars 56-74 are exemplary. Any other user interaction means such as, for example, a pull down menu or text field may be alternatively used.

In this example, the GUI 10 also includes a field 76 enabling the user to select whether weights are or are not to be programmatically assigned to the music genres 16-34 based on an analysis of the user's music collection, or library. As discussed above, the user's music collection is only one example of a media content item group. Other groups may be, for example, media content items identified by one or more playlists created or otherwise acquired by the user, media content items identified by the user such as a subset of the user's media collection, or the like, or any combination thereof.

FIG. 3 illustrates the GUI 10 when the decade tab 14 is selected. As illustrated, the decade related scoring criteria includes a number of decades 78-92. The results of the analysis of step 102 of FIG. 1 for the decades 78-92 are presented in blocks 94-108 associated with the decades 78-92. The blocks 94-108 may be display windows or, as discussed below, buttons or other selection means enabling the user to take some action. Sliding bars 110-124 define the weights assigned to the decades 78-92. Initially, the weights, and thus the sliding bars 110-124, are set to the weights assigned to the decades 78-92 based on the analysis of the group of media content items. The user may then manually adjust the weights by adjusting the sliding bars 110-124. Thus, the weights assigned based on the analysis of the group of media content items may serve as intelligent default weights for the decades 78-92. Again, note that the sliding bars 110-124 are exemplary. Any other user interaction means such as, for example, a pull down menu or text field may be alternatively used.

In this example, the GUI 10 also includes a field 126 enabling the user to select whether weights are or are not to be programmatically assigned to the decades 78-92 based on an analysis of the user's music collection, or library. As discussed above, the user's music collection is only one example of a media content item group. Other groups may be, for example, media content items identified by one or more playlists created or otherwise acquired by the user, media content items identified by the user such as a subset of the user's media collection, or the like, or any combination thereof.

Figure 4:
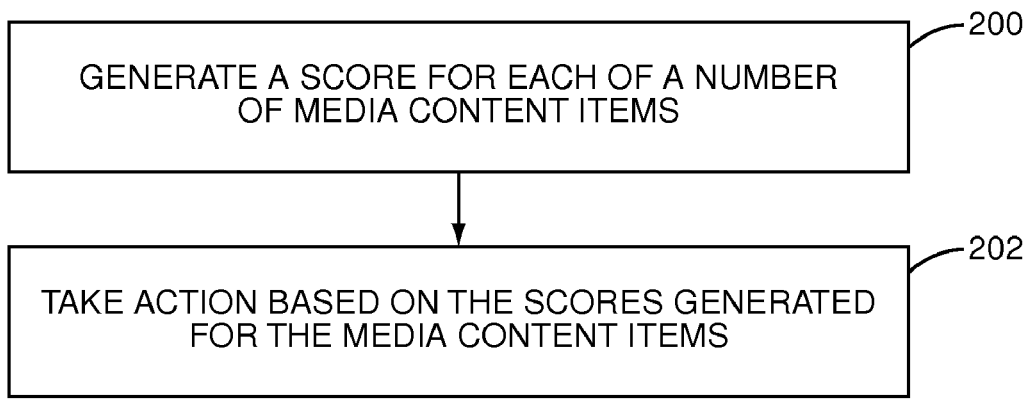
FIG. 4 illustrates a process for scoring media content items as a function of the weights assigned to the scoring criteria and taking an action based on the scores according to one embodiment of the present invention.

FIG. 4 illustrates a process of scoring media content items as a function of the weights assigned to the scoring criteria and taking an action based on the scores according to one embodiment of the present invention. First, a score is generated for each of number of media content items (step 200). One or more media content items may be scored. The media content items scored may be the media content items in the user's media collection, the media content items in one or more playlists of the user, the media content items identified by recommendations provided by a social recommendation system or network, media content items that may potentially be recommended to the user via a media distribution service, or the like.

More specifically, for each media content item to be scored, metadata or information describing the media content item is compared to the scoring criteria in order to identify one or more scoring criterion that are satisfied by the media content item. For example, for a song, the metadata may include information such as a music genre for the song, an artist of the song, an album on which the song was released, a date of release of the song, and the like. Thus, if the scoring criteria includes a number of genres and decades of release, the music genre of the song and the decade in which the song was released may be identified as scoring criteria that are satisfied by the song. The metadata describing the media content item may be stored in and thus obtained from the headers of the same digital file, an associated application file or database, a remote server, or the like. Once the satisfied scoring criteria are identified, the media content item is scored as a function of the weights assigned to the satisfied scoring criteria. Thus, returning to the example, the score for the song may be generated as a function of the weights assigned to the corresponding music genre and decade. For example, the score may be a product or sum of the weights assigned to the corresponding music genre and decade.

Once the media content items are scored, an action may be taken based on the scores of the media content items (step 202). The action taken depends on the implementation. For example, the scores may be utilized to prioritize or sort songs in a playlist, generate a playlist, prioritize media content items identified by recommendations received in a social recommendation system or network, identify recommendations for the user, or the like. Further, the scoring process may be implemented on any type of computing system such as, for example, a server hosting a music distribution service, a user device, or the like. For example, a music distribution service such as, for example, Apple's iTunes® Store may score songs, movies, and/or television shows as discussed above and recommend those having a score above some threshold level to the associated user. As another example, a number of songs in a user's music collection may be scored using the scoring process described above. Playback of the songs may then be prioritized, and optionally automatically effected, based on the scores of the songs. In addition or alternatively, one or more playlists may be generated based on the scores of the songs.

As a final example, the scoring process discussed herein may be used in a social recommendation system such as that disclosed in commonly owned and assigned U.S. patent application Ser. No. 11/484,130, entitled P2P NETWORK FOR PROVIDING REAL TIME MEDIA RECOMMENDATIONS, which was filed on Jul. 11, 2006 and is hereby incorporated herein by reference in its entirety. In this social recommendation system, when a first peer device plays a media content item, it sends a recommendation identifying that media content item to one or more associated peer devices via a peer-to-peer (P2P) network. Likewise, as each of the associated peer devices play media content items, they send recommendations identifying those media content items to the first peer device. In response to receiving recommendations from the associated peer devices, the first peer device may score the recommended media content items and, optionally, locally stored media content items as discussed herein. Playback of the recommended media content items and, optionally, the locally stored media content items may then be programmatically, or automatically, effected based on the scores. Note that the P2P network may be established over a Local Area Network (LAN), a Wide Area Network (WAN), or a combination thereof. Further, when established via a WAN, the recommendations may be exchanged via a central server.

Figure 5:
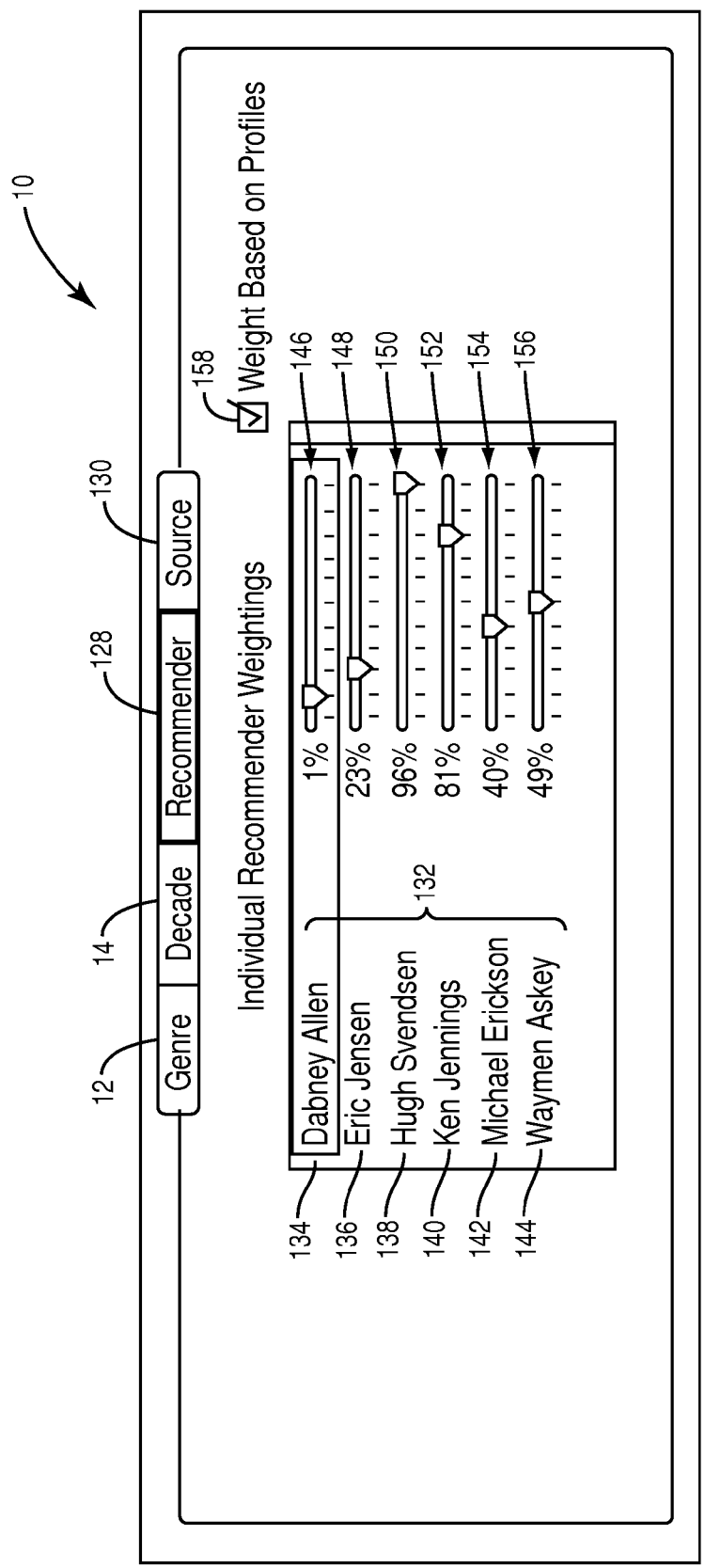
FIG. 5 is another illustration of the GUI of FIGS. 2 and 3 further presenting a list of recommenders in a social recommendation network and weights assigned to the recommenders and enabling the user to manually adjust the weights assigned to the recommenders according to one embodiment of the present invention.

It should be noted that the scoring criteria discussed above may or may not be the only criteria used for the scoring process. Additional criteria may be used such that media content items are scored based on the scoring criteria and the weights assigned to the scoring criteria discussed above as well as additional criterion and their associated weights. As an example, in a social recommendation system, such as the one described in commonly owned and assigned U.S. patent application Ser. No. 11/484,130, it may be desirable to score recommended media content items based scoring criteria such as genre and decade as well as recommender and source. FIG. 5 illustrates the GUI 10 further including a recommender tab 128 and a source tab 130 that may be utilized in such a recommendation system. In this illustration, the recommender tab 128 is selected. As such, a recommender list 132 is presented. The recommender list 132 includes a listing of recommenders 134-144. The recommenders 134-144 may be all recommenders in the user's social network, which are other users from which recommendations are received. Alternatively, the recommenders 134-144 may be recommenders, or other users, from which recommendations have been received in the past. Weights assigned to the recommenders 134-144 may be manually adjusted by the user via sliding bars 146-156. Note that the sliding bars 146-156 are exemplary. Other types of user input means may be utilized.

The GUI 10 also includes a field 158 enabling the user to select whether weights are to be programmatically, or automatically, assigned to the recommenders 134-144. Again, if the weights are programmatically assigned, they may thereafter be adjusted by the user by utilizing the sliding bars 146-156. In one embodiment, weights are programmatically assigned to the recommenders 134-144 based on a degree of similarity between a user profile of the user and user profiles of the recommenders 134-144. Note that the user profiles may be stored in a central database associated with the social recommendation system, exchanged among the peer devices in the social recommendation system as needed, or the like. The user profiles may include, for example, favorite music genre(s), favorite music artist(s), favorite decade(s), favorite video genre(s), favorite actor(s) or actress(es), or the like, or any combination thereof. In addition or alternatively, the user profiles may include demographic information and/or biographical information describing the users.

The degree of similarity between two user profiles may be determined using any desired scheme. For example, if the user profiles include a favorite music genre, a favorite music artist, a favorite decade, age, and home address, the degree of similarity may be determined as a function of a ratio of a number of matching parameters to a total number of parameters in the user profiles. So, if two users have the same favorite music genre, the same music artist, and the same favorite decade and are of the same age group but live in different geographical areas, the degree of similarity may be 4/5, or 80%.

As one exemplary alternative embodiment, the weights assigned to the recommenders 134-144 may be assigned based on the user's media collection. More specifically, the weight assigned to a particular recommender may be determined as a function of a total number of media content items recommended by that recommender as compared to a number of those recommended media content items that have been purchased or otherwise obtained by the user in response to the recommendations from the recommender, played by the user in response to the recommendations from the recommender, scored above a defined threshold, or the like, or any combination thereof.

While not illustrated, the source tab 130 enables the user to assign weights to each of a number of potential sources for media content items to be scored. For example, the potential sources may be, for example, "local," "subscription network," "buy/download," or "find." "Local" means that the media content item, or recommended media content item, is included in the user's local media collection. "Subscription" means that the media content item is available via a subscription-based media distribution service, such as Yahoo! Unlimited, to which the user has a subscription. "Buy/download" means that the media content item is available for purchase and download from a media distribution service such as, for example, the iTunes® Store. Lastly, "find" means that the media content item is not part of the user's local media collection, not available via any subscription-based media service to which the user is registered, and not available for purchase or download from any media distribution service with which the user is registered. In this case, a search of other media distribution services, the Internet, or the like may be performed in an attempt to locate the media content item. Weights may be assigned to each of the potential sources manually by the user.

Figure 6:
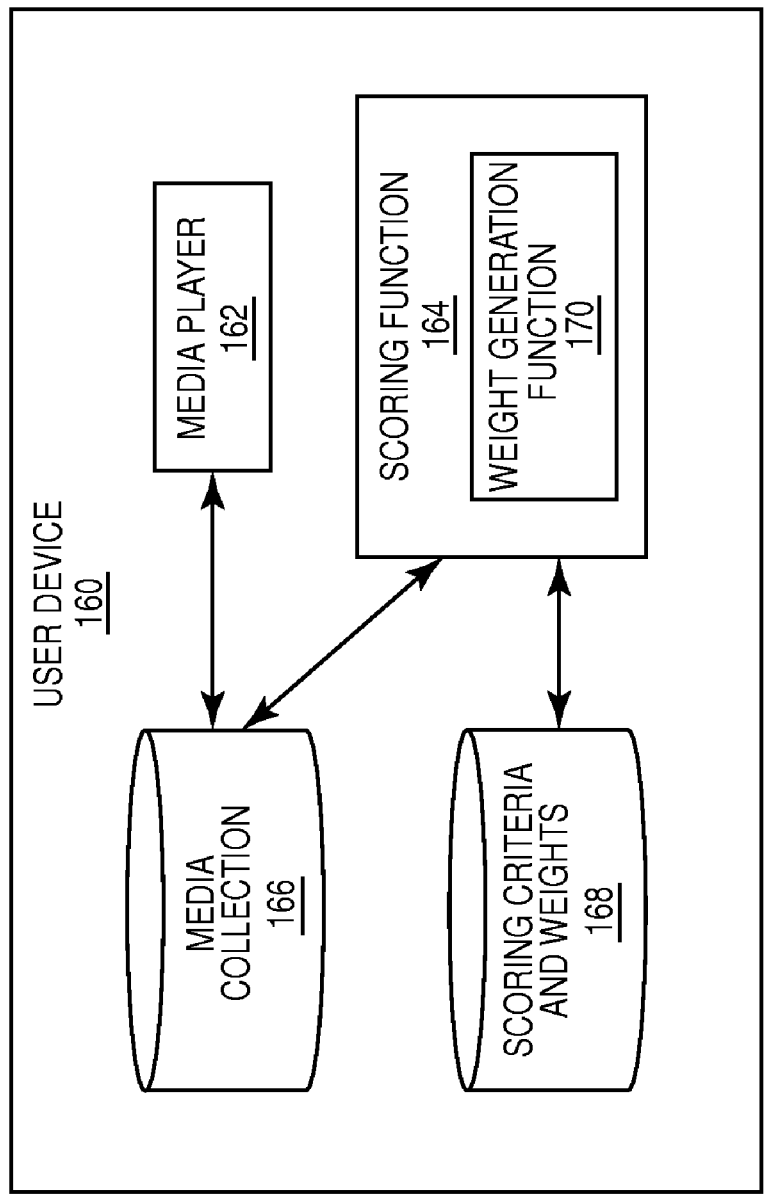
FIG. 6 is a functional block diagram of a user device incorporating a scoring function and a weight assignment function according to one embodiment of the present invention.

FIG. 6 is a functional block diagram of an exemplary user device 160 that operates according to one embodiment of the present invention. The user device 160 may be, for example, a personal computer, a portable media player, a set-top box, a gaming console, or the like. The user device 160 generally includes a media player 162 and a scoring function 164, each of which may be implemented in software, hardware, or a combination thereof. The media player 162 enables playback of media content items in a media collection 166 of an associated user. The scoring function 164 operates to score media content items as a function of scoring criteria and weights assigned to the scoring criteria, which are referred to collectively as scoring criteria and weights 168. The media content items scored by the scoring function 164 may be the media content items in the media collection 166 of the user, media content items in one or more playlists created or otherwise acquired by the user, a subset of the media collection 166, media content items identified by recommendations received by or to be provided to the user device 160 as part of a social recommendation system, or the like, or any combination thereof.

In this embodiment, the scoring function 164 includes a weight generation function 170. However, the weight generation function 170 may alternatively be a separate function. The weight generation function 170 operates to programmatically assign the weights to the scoring criteria in the manner discussed above. More specifically, the weight generation function 170 operates to assign the weights to the scoring criteria based on an analysis of the media collection 166, one or more playlists created by or acquired by the associated user, a number of media content items identified by the user such as a subset of the media collection 166, or the like.

FIG. 7 illustrates a system 172 wherein weights are assigned and media content items are scored at a central server 174 according to another embodiment of the present invention. In general, the system 172 includes the central server 174 and a number of user devices 176-1 through 176-N communicatively coupled via a network 178. The network 178 may be any type of WAN or LAN or any combination thereof. The user devices 176-1 through 176-N include media players 180-1 through 180-N, respectively. The media players 180-1 through 180-N may be implemented in software, hardware, or a combination thereof and operate to provide playback of media content items from associated media collections 182-1 through 182-N of associated users.

The central server 174 includes a scoring function 184, which is preferably implemented in software. However, the present invention is not limited thereto. The scoring function 184 operates to score media content items for the users associated with the user devices 176-1 through 176-N as a function of scoring criteria and weights assigned to the scoring criteria for each of the users, which are referred to collectively as scoring criteria and weights 186. While the scoring criteria may or may not be the same for each of the users, the weights for the scoring criteria are assigned separately for each of the users.

In this embodiment, the scoring function 184 includes a weight generation function 188. However, the weight generation function 188 may alternatively be a separate function. The weight generation function 188 operates to programmatically assign the weights to the scoring criteria for each of the users in the manner discussed above. More specifically, for each user, the weight generation function 188 operates to assign the weights to the scoring criteria for that user based on an analysis of a group of media content items associated with that user. The group of media content items may be, for example, the media collection 182-1, 182-N of that user, one or more playlists created by or acquired by that user, a number of media content items identified by that user such as a subset of the media collection 182-1, 182-N of that user, or the like.

The scoring function 184 may score various media content items depending on the particular implementation. In one embodiment, the scoring function 184 operates to score the media content items in the media collections 182-1 through 182-N of the users, media content items in one or more playlists created or otherwise acquired by the users, subsets of the media collections 182-1 through 182-N of the users, or the like. In order to enable the scoring, the user devices 176-1 through 176-N may provide information identifying the media content items to be scored and, optionally, metadata describing those media content items to the central server 174. Note that the central server 174 may store or otherwise have access to metadata describing the media content items, in which case only information identifying the media content items to be scored needs to be provided from the user devices 176-1 through 176-N to the central server 174.

In addition or alternatively, the scoring function 184 may score media content items identified by recommendations received by or to be provided to the user devices 176-1 though 176-N as part of a social recommendation system. Note that, in one embodiment, the user devices 176-1 through 176-N may be part of a social recommendation system, and the central server 174 may provide a proxy function for communicating recommendations between the user devices 176-1 through 176-N. In this case, the scoring function 184 may score the recommendations prior to sending the recommendations to their destinations.

In another embodiment, the central server 174 may be part of a media distribution service. In this embodiment, the weights for the scoring criteria may additionally or alternatively be determined based on an analysis of media content items previously downloaded and/or purchased by the users of the user devices 176-1 through 176-N from the music distribution service. The scoring function 184 may score media content items available from the media distribution service in order to make recommendations to the users. More specifically, for each user, the available media content items, or some subset thereof, are scored based on the scoring criteria and weights for the user. The music distribution service may then recommend media content items having scores above a threshold value or media content items having the M highest scores to the user.

While FIGS. 6 and 7 illustrate two different systems in which the present invention may be implemented, the present invention is not limited thereto. For example, the present invention may be implemented in a hybrid system. More specifically, in a social recommendation system where user profile matching is utilized to assign weights to recommenders, weights for the recommenders may be assigned at a central server having access to the needed user profiles. Weights for the scoring criteria may be assigned at a user device, which has access to the desired group of media content items to be analyzed such as, for example, the user's media collection. Media content items may then be scored for the user either at the central server or at the user device.

FIG. 8 illustrates a process enabling a user to take an action based on the results of the analysis of FIG. 1 according to one embodiment of the present invention. First, the results of the analysis of the group of media content items with respect to the scoring criteria are presented to the associated user (step 204). In response, the associated user is enabled to interact with the results to take an action such as viewing a list of media content items from the group that satisfy a select criterion or a select combination of criteria from the scoring criteria and/or re-classify media content items (step 206). The user may additionally or alternatively be enabled to take other actions such as initiating playback of media content items satisfying one or more of the scoring criteria, initiating creation of a playlist including media content items satisfying one or more of the scoring criteria, or the like.

FIG. 9 illustrates the process of FIG. 8 with respect to the exemplary GUI 10. In this example, the block 36 is a button 36. In response to activating the button 36, a listing 190 is presented to the user. The listing 190 is a list of all media content items in the group of media content items analyzed that satisfy the associated scoring criterion, which in this case is the Alternative music genre. The user may further be enabled to re-classify the media content items in the listing 190 into another music genre. For example, by selecting a media content item in the listing 190, a listing of music genres 192 is presented to the user. In this example, the current music genre in which the media content item is classified is presented in bold font. The user may re-classify the selected media content item into another music genre by selecting another music genre from the listing of music genres 192. A similar mechanism may be used to re-classify media content items with respect to other scoring criteria such as, for example, decades.

Note that while the process of FIGS. 8 and 9 has been discussed as being in addition to assigning weights to the scoring criteria for the scoring process, the present invention is not limited thereto. More specifically, a group of media content items may be analyzed with respect to criteria, which may or may not be utilized for scoring media content items. The results of the analysis may then be presented to the associated user. The associated user may then be enabled to take some action such as viewing a listing of media content items from the group that satisfy a select criteria or a select combination of criteria. The user may additionally or alternatively be enabled to take other actions such as initiating playback of media content items satisfying one or more of the criteria, initiating creation of a playlist including media content items satisfying one or more of the criteria, or the like.

Those skilled in the art will recognize improvements and modifications to the preferred embodiments of the present invention. All such improvements and modifications are considered within the scope of the concepts disclosed herein and the claims that follow.

What is claimed is:

1. A computer implemented method comprising:
defining a plurality of criteria;
analyzing, by a computing device, a group of media content items with respect to the plurality of criteria to provide analysis results, wherein the group of media content items is associated with a user profile, wherein analyzing, by the computing device, the group of media content items with respect to the plurality of criteria comprises:
   determining a number of media content items from the group of media content items satisfying each of the plurality of criteria; and
   providing the number of media content items from the group of media content items satisfying each of the plurality of criteria as the analysis results;
programmatically assigning, by the computing device, weights to the plurality of criteria for the user profile as a function of the analysis results; and
scoring, by the computing device, at least one media content item as a function of the weights assigned to the plurality of criteria.

2. The method of claim 1 wherein scoring, by the computing device, the at least one media content item comprises, for each media content item from the at least one media content item:
identifying, by the computing device, at least one criterion from the plurality of criteria satisfied by the media content item; and
scoring, by the computing device, the media content item as a function of the weight assigned to the at least one criterion.

3. The method of claim 1 further comprising:
after programmatically assigning, by the computing device, the weights to each of the plurality of criteria, displaying, with a user interface of the computing device, the weights assigned to each of the plurality of criteria; and
enabling a user to manually adjust the weights assigned to the plurality of criteria displayed on the user interface.

4. The method of claim 1 wherein scoring, on the computing device, the at least one media content item comprises scoring, by the computing device, a plurality of media content items in a playlist of a user as a function of the weights assigned to the plurality of criteria to provide scores for the plurality of media content items in the playlist, the method further comprising sorting, by the computing device, the plurality of media content items in the playlist based on the scores.

5. The method of claim 1 further comprising:
receiving, at the computing device, wherein the computing device is associated with a user, a plurality of recommendations via a social recommendation system, wherein the recommendations identify a plurality of media content items; and
wherein scoring, by the computing device, the at least one media content item as the function of the weights assigned to the plurality of criteria comprises scoring the plurality of media content items identified by the plurality of recommendations as a function of the weights assigned to the plurality of criteria to provide scores for the plurality of media content items.

6. The method of claim 5 further comprising programmatically effecting, by the computing device, playback of the plurality of media content items identified by the plurality of recommendations based on the scores for the plurality of media content items.

7. The method of claim 1 wherein scoring, by the computing device, the at least one media content item comprises scoring a plurality of media content items available to a user via a media distribution service to provide scores for the plurality of media content items, the method further comprising:
identifying, by the computing device, at least one media content item to recommend to the user from the plurality of media content items available to the user based on the scores;
determining, by the computing device, a recommendation of the at least one media content item; and
displaying, on a user interface, the recommendation of the at least one media content item.

8. The method of claim 1 wherein each of the plurality of criteria is one of the group consisting of: a user-defined criterion and a system-defined criterion.

9. The method of claim 1 wherein the group of media content items comprises a media collection related to the user profile.

10. The method of claim 1 wherein the group of media content items comprises a plurality of media content items identified by at least one playlist related to the user profile.

11. The method of claim 1 wherein the group of media content items comprises a subset of a media collection of a user.

12. The method of claim 1 wherein the group of media content items comprises a plurality of media content items previously obtained by a user from a media distribution service.

13. The method of claim 1 wherein:
programmatically assigning, by the computing device, the weights to the plurality of criteria as the function of the analysis results comprises translating the analysis results for the plurality of criteria into the weights for the plurality of criteria.

14. The method of claim 1 wherein the analysis results are indicative of a relevancy of each of the plurality of criteria to a user associated with the user profile, and programmatically assigning, by the computing device, the weights to the plurality of criteria as the function of the analysis results comprises:
assigning, by the computing device, a maximum weight as the weight for a first criterion from the plurality of criteria having a greatest relevancy to the user associated with the user profile; and
determining, by the computing device, the weights for at least one remaining criterion from the plurality of criteria as a function of the relevancy of the at least one remaining criterion to the user associated with the user profile as compared to the relevancy of the first criterion to the user associated with the user profile.

15. The method of claim 1 further comprising:
displaying, on a user interface of the computing device, the analysis results; and
receiving, at the user interface, an action in response to display of the analysis results.

16. The method of claim 15 wherein the action is one of the group consisting of:
initiating playback of ones of the group of media content items satisfying a select one of the plurality of criteria; and
initiating playback of ones of the group of media content items satisfying a select combination of at least two of the plurality of criteria.

17. The method of claim 1 further comprising:
displaying, on a user interface of the computing device, a list of media content items from the group of media content items that satisfies a select one of the plurality of criteria; and
displaying the list of media content items from the group of media content items that satisfies a select combination of at least two of the plurality of criteria.

18. A system comprising:
a processor in communication with a memory, the processor configured to execute a plurality of computer program modules, the memory including the plurality of computer program modules executable on the processor, the computer program modules including:
a weight assignment function adapted:
to analyze a group of media content items with respect to a plurality of criteria to provide analysis results, by determining a number of media content items from the group of media content items satisfying each of the plurality of criteria, and providing the number of media content items from the group of media content items satisfying each of the plurality of criteria as the analysis results; and
to programmatically assign weights to the plurality of criteria for the user profile as a function of the analysis results; and
a scoring function adapted to score at least one media content item as a function of the weights assigned to the plurality of criteria.

19. The system of claim 18 wherein the system comprises a server, and the weight assignment function and the scoring function are implemented on the server.

20. The system of claim 18 wherein the system comprises a user device, and the weight assignment function and the scoring function are implemented on the user device.

21. The method of claim 1 wherein the computing device includes a server, and the assigning weights to the plurality of criteria as the function of the analysis results and the scoring at least one media content item as the function of the weights assigned to the plurality of criteria are implemented on the server.

22. The method of claim 1 wherein the computing device includes a user device, and the assigning weights to the plurality of criteria as the function of the analysis results and the scoring at least one media content item as the function of the weights assigned to the plurality of criteria are implemented on the user device.

23. A computer implemented method, comprising:
defining a plurality of criteria; and
analyzing, by a computing device, a group of media content items with respect to the plurality of criteria to provide analysis results, wherein analyzing, by the computing device, the group of media content items with respect to the plurality of criteria comprises:
determining a number of media content items from the group of media content items satisfying each of the plurality of criteria;
providing the number of media content items from the group of media content items satisfying each of the plurality of criteria as the analysis results;
programmatically assigning, by the computing device, weights to the plurality of criteria as a function of the analysis results; and
scoring, by the computing device, at least one media content item as a function of the weights assigned to the plurality of criteria.

24. A computer implemented method, comprising:
defining a plurality of criteria; and
analyzing, by a computing device, a group of media content items with respect to the plurality of criteria to provide analysis results, wherein analyzing, by the computing device, the group of media content items with respect to the plurality of criteria comprises:
determining a percentage of media content items from the group of media content items satisfying each of the plurality of criteria;
providing the percentage of media content items from the group of media content items satisfying each of the plurality of criteria as the analysis results;

programmatically assigning, by the computing device, weights to the plurality of criteria as a function of the analysis results; and scoring, by the computing device, at least one media content item as a function of the weights assigned to the plurality of criteria.

25. A system comprising:

a processor in communication with a memory, the processor configured to execute a plurality of computer program modules, the memory including the plurality of computer program modules executable on the processor, the computer program modules including:

a weight assignment function adapted:
   to analyze a group of media content items with respect to a plurality of criteria to provide analysis results by:
      determining a number of media content items from the group of media content items satisfying each of the plurality of criteria; and
      providing the number of media content items from the group of media content items satisfying each of the plurality of criteria as the analysis results; and
   to programmatically assign weights to the plurality of criteria as a function of the analysis results; and a scoring function adapted to score at least one media content item as a function of the weights assigned to the plurality of criteria.

26. A system comprising:

a processor in communication with a memory, the processor configured to execute a plurality of computer program modules, the memory including the plurality of computer program modules executable on the processor, the computer program modules including:

a weight assignment function adapted:
   to analyze a group of media content items with respect to a plurality of criteria to provide analysis results by:
      determining a percentage of media content items from the group of media content items satisfying each of the plurality of criteria; and
      providing the percentage of media content items from the group of media content items satisfying each of the plurality of criteria as the analysis results; and
   to programmatically assign weights to the plurality of criteria as a function of the analysis results; and a scoring function adapted to score at least one media content item as a function of the weights assigned to the plurality of criteria.

\* \* \* \* \*